United States Patent [19]

Houser

[11] Patent Number: 4,561,976
[45] Date of Patent: Dec. 31, 1985

[54] WATER PURIFICATION SYSTEM

[76] Inventor: Stan Houser, 288 Mill Rd., Suite E-45, Etobicoke, Ontario, Canada, M9C 4X7

[21] Appl. No.: 610,354

[22] Filed: May 15, 1984

[51] Int. Cl.⁴ ............................................. B01D 25/06
[52] U.S. Cl. .................................................... 210/290
[58] Field of Search ............... 210/663, 669, 683, 694, 210/266, 283, 284, 290

[56] References Cited

U.S. PATENT DOCUMENTS

| | | | |
|---|---|---|---|
| 2,518,409 | 8/1950 | Williamson | 210/674 |
| 2,752,309 | 6/1956 | Emmons et al. | 210/685 |
| 2,981,681 | 4/1961 | Dunlop | 210/660 |
| 3,252,898 | 5/1966 | Davis | 210/679 |
| 3,266,973 | 8/1966 | Crowley | 162/164 |
| 3,554,377 | 1/1971 | Miller | 210/283 |
| 3,625,886 | 12/1971 | Mattia | 210/694 |
| 3,729,410 | 4/1973 | Abadie et al. | 210/671 |
| 3,870,033 | 3/1975 | Faylor et al. | 210/669 |
| 3,985,648 | 10/1976 | Casolo | 210/669 |
| 4,277,332 | 7/1981 | Baughn | 210/96.2 |
| 4,302,335 | 11/1981 | Habermas | 210/669 |
| 4,305,826 | 12/1981 | Moses | 210/687 |
| 4,341,636 | 7/1982 | Harder et al. | 210/662 |
| 4,383,920 | 5/1983 | Muller et al. | 210/284 |
| 4,400,278 | 8/1983 | Martinola | 210/678 |

OTHER PUBLICATIONS

"Dowex 22", Dow Chemical brochure.
A. C. Carbone, Canada Inc./Ability of Activated Carbon, To Remove Various Substances from Water, pp. 1–13.
"Water Filters", Consumer Reports, Feb. 1983.
Union Carbide/Molecular Sieves/Developments Products, S-115.
MacMillan Journals Ltd., 1978/Silicalite, A New Hydrophobic Crystalline Silica Molecular Sieve/Authors—E. M. Flanigen, J. M. Bennett et al.

Primary Examiner—Ivars Cintins
Attorney, Agent, or Firm—Panitch Schwarze Jacobs & Nadel

[57] ABSTRACT

A filter device for removing organic contaminants from water comprises a filter housing having an inlet for water at one end and an outlet for water at an opposite end and three layers of filter material contained in the housing. The first layer is a hydrophobic organophilic silicalite capable of functioning as a molecular sieve and of adsorbing molecules as large as benzene. The second layer comprises a type I, strong base anion exchange resin of high porosity and high capacity while the third layer comprises activated carbon. The three layers are arranged one after another in series. Preferably the first layer is S-115 silicalite while the second layer is a copolymeric matrix made from styrene divinylbenzene. In the preferred embodiment the first layer of material is adjacent to the inlet.

14 Claims, 3 Drawing Figures

WATER PURIFICATION SYSTEM

BACKGROUND OF THE INVENTION

This invention relates to filter devices for removing organic contaminants from water either in the home or on a larger scale in a plant operated by industry or by a utility.

The problem of organic contaminants in domestic water supplies is well recognized at the present time. Some of these contaminants are quite dangerous although they may be present in drinking water in only a minute amount. It will be appreciated that it is difficult for authorities and scientists to determine the long-term harmful effects, if any, of these contaminants on human beings, particularily in view of the fact that there are a wide variety of such materials and the particular contaminants in any given drinking supply can vary from one community to another.

In an article entitled "Water Filters" published in Consumer Reports, February 1983, a number of existing water filtration systems and devices are described. It is recognized in this article that the known filters can help improve the taste or smell of the drinking water but not all are effective at controlling more dangerous contaminants. According to the same article more than 700 organic chemicals have been identified in drinking water and some of them are suspected cancer-causing agents.

Activated-carbon water filters are widely used to clean up water in bottling plants. On a more modest scale, carbon filters are used in the home to filter tap water. Some domestic water filters are attached to the faucet of the sink while others are installed in the cold-water line which may lead to a faucet.

Filters using carbon only may be unable to remove some dangerous organic compounds that are present in drinking water or drinking supplies. As an example of contaminants that exist in drinking water, the following list of organic compounds and the quantity thereof was published in Homemakers magazine in March 1983. The list was compiled by the organization known as Pollution Probe and it is based on a sample of water from Lake Ontario taken at a Toronto, Ontario location.

| ORGANIC COMPOUNDS | (parts per billion) |
|---|---|
| Aromatic Hydrocarbons | |
| Benzene | .33 ppb |
| Toluene | .10 ppb |
| Ethylbenzene | Trace |
| O—Xylene | Trace |
| M—Xylene | Trace |
| P—Xylene | Trace |
| Pesticides | |
| BHC | .008 ppb |
| Lindane | .003 ppb |
| DDE | .002 ppb |
| Dieldrin | .001 ppb |
| PCBs | .001 ppb |
| Trihalomethanes | |
| Chloroform | 5.9 ppb |
| Bromodichloromethane | 7.5 ppb |
| Chlorodibromomethane | 1.8 ppb |

Filters that employ filter materials other than or in addition to activated carbon are known. For example U.S. Pat. No. 4,305,826 issued Dec. 15, 1981 to Moses describes and illustrates a multi-layered filter for softening and filtering water. The first layer comprises particles of activated carbon, the second layer consists of beads of an organic ion cation exchange resin, the third layer is made up of granules of sodium aluminum silicate, and the fourth layer consists of filter sand. The layers are arranged vertically in a tank. The second and third layers of this filter act to soften the water. In addition the zeolite granuals in the third layer according to the patent will filter out most particles in the water whose size is greater than 20 microns.

Earlier U.S. Pat. No. 3,266,973 issued Aug. 16, 1966 to Richard P. Crowley describes a method of preparing paper stock which has an affinity for particular materials. During the manufacturing process finely divided zeolite crystaline molecular sieve particles are added to the pulp which is then formed into a sheet and dried. The product described in the patent can be used as filter paper capable of removing particles, gases and the like of a particular size and dimension from a fluid stream. In one embodiment the molecular sieve particles are employed in combination with water insoluble ion exchange resins to incorporate a combination of ion exchange and adsorbent properties into the fibrous material.

It is an object of the present invention to provide a filter device having at least three different filtering materials, which device is able to remove a wide range of organic materials from water.

It is a further object of the invention to provide a filter device that is easy to construct and that can be produced at a relatively low cost.

Devices constructed in accordance with the invention can be developed and designed for home or domestic use or for use by industry or utilities. Because the purchase cost of the domestic device is reasonably low, the homemaker need not regenerate the filter materials although this could be done with a large filter system such as one that might be used by a commercial operation or a utility.

SUMMARY OF THE INVENTION

According to the present invention a filter device for removing organic contaminants from water comprises a filter housing having an inlet for water at one end and an outlet for water at an opposite end and three layers of filter material. The first layer comprises a hydrophobic, organophilic silicalite capable of functioning as a molecular sieve and of adsorbing molecules as large as benzene. The second layer comprises a type I strong base anion exchange resin of high porosity and high capacity while the third layer is activated carbon. The three layers are arranged in series in the housing.

In a particularly preferred embodiment the first layer is S-115 silicalite, a crystalline silica material produced by Union Carbide. The second layer is Dowex-11 resin which is a copolymeric matrix made from styrene divinylbenzene.

Further features and advantages will become apparent from the following detailed description taken in conjunction with the accompanying drawings wherein:

DETAILED DESCRIPTION OF PREFERRED EMBODIMENT

Figure 1:
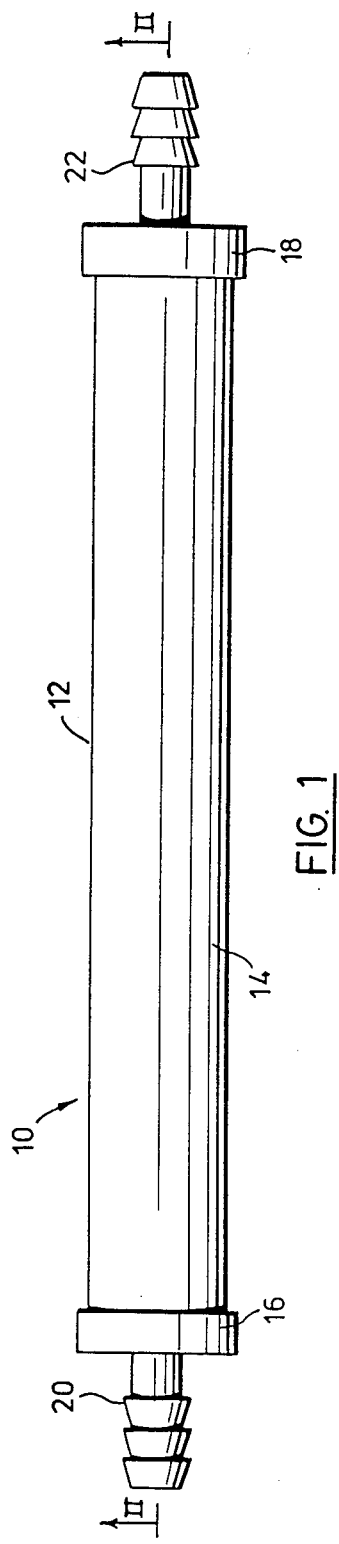
FIG. 1 is a side view of one embodiment of the filter device.

Referring to FIG. 1 which is an illustration of one preferred embodiment of the present invention designed for domestic use, a filter device 10 for removing organic contaminants from water includes an elongate filter housing 12. This housing includes a relatively long, tubular main section and two end caps 16 and 18. Each end cap may be provided with an intregal half inch nipple 20, 22 adapted for connection in a cold water supply line such as one supplying a faucet where drinking water is obtained. In the illustrated embodiment the nipple 20 forms an inlet for water while the nipple 22 forms an outlet. Thus water leaving the outlet 22 would be substantially decontaminated by the filter device and would be available to be dispensed out of a faucet.

The illustrated filter housing can be made from standard plumbing parts and this permits the cost to be kept relatively low. Both the main section 14 and the end caps can be constructed from inexpensive polyvinyl chloride One of the end caps such as the cap 18 can be permanently glued to the main setion of a well known manner. Preferably the other cap 16 is removable in order that the contents of the filter device can be removed for regeneration or replacement. In the illustrated embodiment the cap 16 is simply threaded onto the threaded end of the main section 14 and thus can be removed by simply rotating the end cap relative to the main section. In one preferred embodiment intended for domestic use the main section is constructed of one and a half inch diameter pipe and the overall length of the device measured between the outer ends of the two nipples is approximately 26".

Preferably in order to prevent the possible escape of filter material out the outlet 22, a screen member or perforated disk 24 is provided in the housing adjacent to the inner end of the nipple 22.

The present filter device is constructed with at least three layers of filter material indicated at 26, 28 and 30. The layer closest to the inlet is composed of a hydrophobic, organophilic silicalite capable of functioning as a molecular sieve and of adsorbing molecules as large as benzene. This material forms the thinnest layer of the three. The second layer comprises a type I, strong base anion exchange resin of high porosity and high capacity. Although this layer is substantially thicker than the first layer, in a preferred embodiment its length $L_2$ is considerably less than the length $L_3$ of the third layer 30. The third layer is composed of relatively inexpensive and well known activated carbon. As can be seen from FIG. 2 the three layers 26, 28 and 30 are arranged in series so that water entering the inlet must pass through each of the layers in order to reach the outlet at the nipple 22.

Turning now to a more detailed description of the materials forming each of the three layers in this filter device and the function thereof the preferred silicalite used to form the first layer is that sold by Union Carbide under trade name S-115. This material is a crystalline, silica material which exhibits characteristics of molecular sieves. Its composition is $SiO_2$ and it is more than 99% pure. At ambient temperatures S-115 silicalite will adsorb molecules as large as benzene (kinetic diameter 5.85 A) but rejects molecules larger than 6 A). The capital structure of S-115 silicalite is a topologic type of tetrahedral framework, which contains a large fraction of five-membered rings of silicon-oxygen tetrahedra. Its channel system is composed of near-circular zig-zag channels cross-linked by elliptical straight channels. Both channels are defined by 10-rings. The following table sets out some physical properties:

PHYSICAL PROPERTIES OF S-115 SILICALITE

Free aperture
   Zig-zag channels . . . 5.4 A
   Straight channels . . . 5.75×5.15 A
Pore volume . . . 0.19 cc/gm
Crystal density . . . 1.76 gm/cc
Largest molecule adsorbed . . . Benzene
Form . . . Granular Unlike aluminosilicate zeolite surfaces, S-115 silicalite has a very low selectivity for the adsorption of water and a very high preference for the adsorption of organic molecules smaller than its limiting pore size. Because the process of adsorption by this material is *irreversible* under normal conditions (for example the conditions that would be encountered during household use of the filter device) removal of organics having a small molecular weight is assured for at least a considerable length of time. Moreover the removal of these organics can help to protect the other two layers of filter material which could be damaged by the presence of trihalomethanes, phenol derivatives and other materials that might be present in the water supply and that are adsorbed by the silicalite. It will be appreciated by those skilled in the art that the other filter materials used in the present filter are flow-dependent while the silicalite layer is not under normal conditions (pressure and temperature) because the adsorption of the organic materials is permanent. Thus a change in the rate of flow of water through the filter device will not remove the adsorbed materials from the silicalite and bring them back into solution.

Turning now to the second layer of filter material, the preferred anion exchange resin is Dowex-11 which is a type 1, strong base resin of high porosity. Dowex 11 is in the form of hard, cream colored spheres having a minimum sphericity of 80%. It has a standard screen size of 20–50 mesh (wet). Such a material removes organics from the water in two different ways. The first is an actual ion exchange which occurs with organics containing carboxyl groups. The second method is adsorption of organics on the porous surface of the resin beads by a mechanism based on Van-Der Waals forces.

As an example of the type of material that can be removed using Dowex-11, humic acids can be removed as they have at least one carboxyl group. An acid of this type will react chemically with the resin even after the active sites on the resin have been exhausted by reaction with such materials as silicates, carbonates and other inorganics. The reason for this is that the resin has a higher affinity towards organic materials than to inorganics. The organic thus replaces the inorganic which may very well be a harmless material in any event.

The aforementioned second method by which the resin removes organic materials is a purely physical phenomenom. There is no formation of a covalent bond.

Another preferred anion exchange resin that can be used in the present filter device is sold under the trade name Ionac A-642. This material is a type 1, strong base macroporous resin. It is highly efficient and durable and has a high capacity. It can be obtained from the Ionac Chemical Company.

It will be appreciated by those skilled in the art that the anion exchange resin will remove many contaminants that are not adsorbed by the first layer. In particular it will remove organic materials whose size exceeds that of benzene. Although some of the organic materials captured by the second layer would likely be caught by the third layer comprising activated carbon, certainly not all of them would be and moreover this second layer of filter material is less flow dependent than the third layer of activated carbon. Thus the use of this second layer contributes to the overall efficiency of the filter device.

The third layer 30 comprising activated carbon polishes the product. In other words it will remove any disagreeable smell from the water as well as any bad taste that might exist including residual chlorine. The carbon also catches suspended particles that manage to pass through the city's filtration plant. Finally the carbon will catch organics that were not adsorbed or otherwise removed by the first two layers of the filter. The efficiency and capability of the third layer is increased by making the distance $L_3$ as long as practically possible.

It is well recognized that adsorption in activated carbon is an important tool for water purification and this applies especially to dissolved organic substances which are responsible for taste or odour or may actually be of an irritating or poisonous nature. Activated carbon is capable of removing some substances by catalytic reaction. For example chlorine is removed in this manner by activated carbon. Some types of particulate matter are removed by carbon by a mechanical filtration action.

Figure 3:
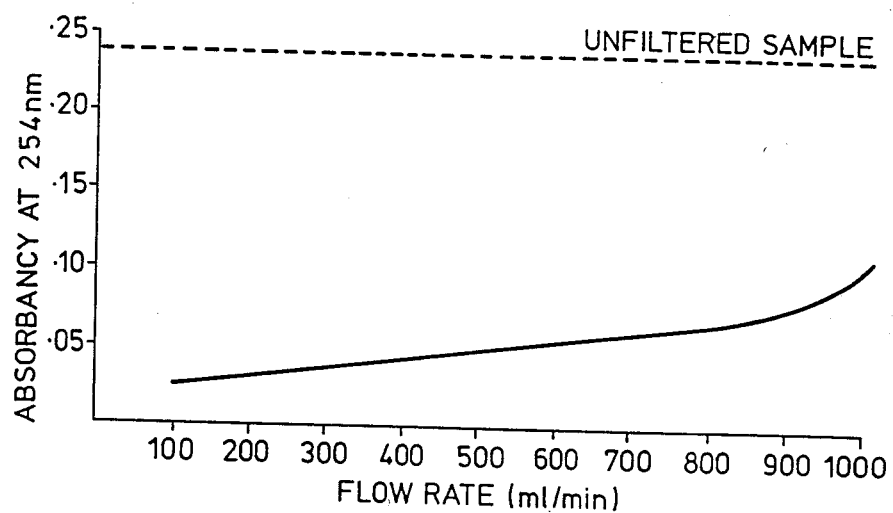
FIG. 3 is a graph illustrating the flow dependency of the filter of the present invention.

Capacity tests have been run on a filter device constructed in accordance with the present invention and containing about 500 grams of activated carbon, 100 grams of Dowex-11 resin and 40 grams of S-115 silicalite. These tests have shown that there is no breakthrough of the filter materials for a run of up to 800 imperial gallons of water. However the filter is flow dependent as illustrated by the graph of FIG. 3. The graph illustrates the ability of the filter to remove contaminants over the practical range for the size of the filter that was tested. The testing for capacity and flow dependency was done by monitoring absorbancy at 254 nm using a Pye-unicam UV Spectrophotometer. FIG. 3 illustrates that the ability of the filter to remove contaminants was excellent at a flow rate of up to 200 milliliters per minute. However this ability decreased at a uniform rate as the flow rate was increased to 800 milliliters per minute but even at the latter rate the percentage of contaminants removed is considerable. The horizontal dash line running across the top of the graph represents the quantity of contaminants in the unfiltered tap water which was used for the tests. The tests were carried out at 254 nanometers because the absorbance at this level is accepted by those working in this art as a rough measure of organic material.

The filter of the present invention has been tested to determine its efficiency in the removal of organic material from the ordinary tap water. The sample tap water that was used was from the city of Toronto water system, which water contains organic materials amounting to around 4 ppm. This comes as a rough estimate from 2 ppm of total organic carbon as proven by tests. The test results on this tap water were as follows:

| Sample Identification | TOC mg/l |
| --- | --- |
| tap water | 1.77 |
| after filter water | 0.32 |

The letters TOC represent total organic carbon. The test was carried out by an independent testing organization and it reveals that the present filter is capable of removing 81½% of organic materials from tap water. It will be appreciated that a removal of this high percent of contamination could very well be of considerable benefit to users of the applicant's filter device.

For comparison purposes tests were also conducted to determine the efficiency of a filter device employing only activated carbon and another filter employing both activated carbon and a suitable ion exchange resin. Both filters performed less efficiently than the filter device of the present invention and in fact the carbon only filter was considerably less efficient as indicated by the following results:

| ACTIVATED CARBON ONLY | |
| --- | --- |
| Sample Identification | TOC mg/L |
| tap water | 2.15 |
| after filter water | 1.97 |

As can be seen from the above figures the filter device employing activated carbon only was able to remove only 8% of the total organics. Improved results from a carbon filter could probably be obtained by altering the filter or the conditions of use. Nevertheless carbon filters suffer from other deficiencies including the fact that adsorption can be temporary and can be reversed. For example a sudden increase of flow through the filter or an interruption in the flow and subsequent re-establishment thereof can cause adsorbed molecules to be released from the pores of the filter material and to re-enter the water.

A test on the filter device employing activated carbon together with an ion exchange resin produce the following results:

| CARBON AND RESIN FILTER | |
| --- | --- |
| Sample Identification | TOC mg/L |
| tap water | 2.15 |
| after filter water | 0.6 |

Thus this test resulted in a 72% removal of organic contaminants from the tap water. Although this results is a considerable improvement over the result produced by the carbon only filter, it is clearly not as good as the filter of the present invention. Moreover it should be kept in mind that the almost 10% improvement provided by the filter device of the present invention may signify that important and dangerous contaminants are being removed substantially from the water while they are not being removed by the filter employing only two filter materials.

Figure 2:
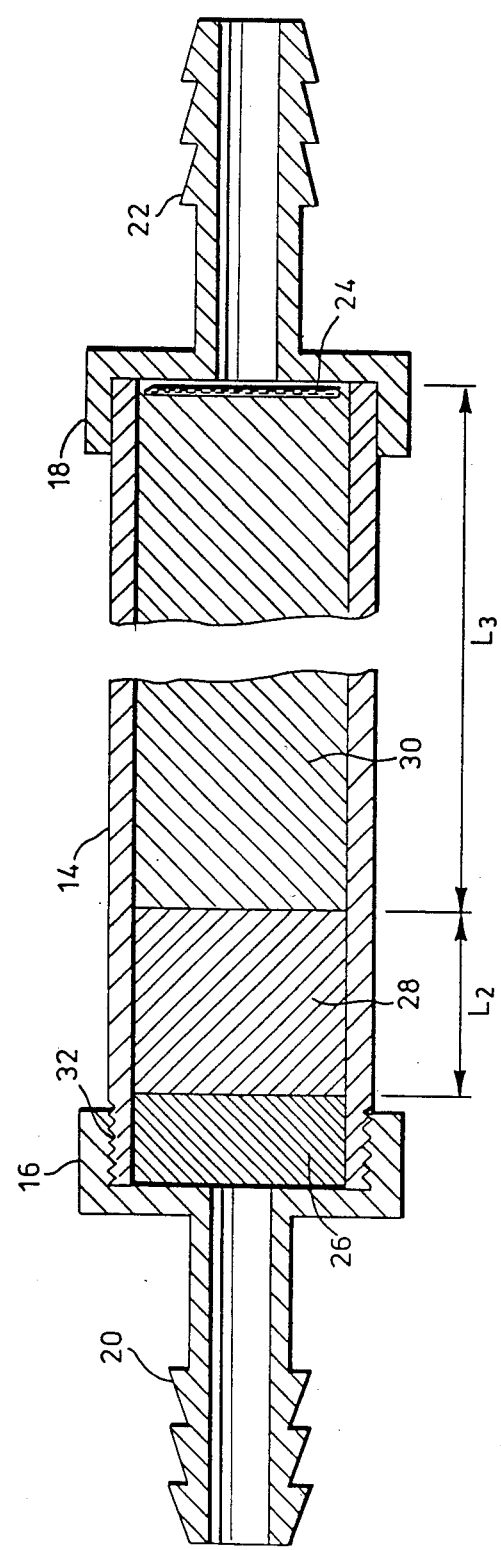
FIG. 2 is a sectional view taken along the line II—II of FIG. 1.

Although it may not be practical for small filters intended for home use, it is possible to regenerate the filter materials used in the filter device of the present invention. If the present filter device was used by a utility or a large commercial operation, it would of course be constructed on a much larger scale than that indicated for a domestic filter device. However the commercial filter would be constructed in essentially the same manner as that illustrated in the drawings. In many commercial applications it would be practical to remove one end of the filter device and remove the filter materials for regeneration. This possibility is indicated in FIG. 2 by the threads 32 on the end caps 16. The end of the main section 14 is also threaded in order to detachably receive the end cap.

Regeneration of the silicalite is carried out by the use of solvents and subsequent evaporation of the solvent from the material. Other known techniques are also available. The preferred resin Dowex-11 can be regenerated by means of a brine and HCl treatment. A salt solution subjects the resin to different osmotic pressures and different surface tensions. The effect is to counteract the Van-Der Waals forces so that the organics are released. In practice this brine treatment is accompanied by the injection of hydrochloric acid which regenerates the active sites of the resin and releases from them the carboxyl-containing molecules. In each case the removal effect is permanent under normal conditions.

The activated carbon material is the least expensive material and it may be more practical in many applications to simply replace this material with new activated carbon rather than attempt to regenerate used material. However the service life of activated carbon can in some cases be extended by means of a steam treatment.

Objections have been raised in the past to the use of adsorbing filters on the grounds that there may be a health hazard due to possible bacterial growth and their service life can be rather limited because their ability to function terminates when they reach the saturation point. With respect to the first objection, a filter constructed in accordance with the present invention was left in a wet state for about two and a half weeks and then treated with a countercurrent flow of tap water having about 0.08 ppm of free chlorine. After allowing the filter bed to settle, rinse samples were taken and subjected to BOD tests which showed negative every time. For domestic use the filter can be combined with a bacteria killing device such as the known one using ultraviolet light.

With respect to the possible saturation of the present filter, it should be appreciated that every filter of a certain size has a safe service life before saturation will occur. However a problem can occur if the filter is subjected to vigorous shaking which can release trapped organics into effluent. It is submitted however that saturation should not be a problem with the present filter if proper care is taken by the user and it is not used beyond its recommended service life. Proper use of the filter would include initial rinsing in, placing the filter at one steady angle or position and an occasional backwash.

What I claim as my invention is:

1. A filter device for removing organic contaminants from water comprising a filter housing having an inlet for water at one end and an outlet for water at an opposite end, a first layer of filter material comprising a hydrophobic, organophilic silicalite which is a crystalline silica molecular sieve capable of adsorbing molecules as large as benzene, a second layer of filter material comprising a type I, strong base anion exchange resin of high porosity and high capacity, and a third layer of filter material comprising activated carbon, said three layers being arranged in series in said housing.

2. A filter device according to claim 1 wherein said silicalite is formed of at least 99 percent $SiO_2$, has a pore volume of 0.19 cc/gm and a crystal density of 1.76 gm/cc, and contains a large fraction of five-membered rings of silicon-oxygen tetrahedra.

3. A filter device according to claim 2 wherein said housing is elongate with said first layer of filter material provided adjacent to said inlet.

4. A filter device according to claim 2, for domestic use wherein said housing is constructed of polyvinyl chloride pipe and a screen member is provided in said housing and over said outlet to prevent escape of carbon through said outlet.

5. A filter device according to claim 2 containing at least 40 grams of silicalite, at least 100 grams of resin and about 500 or more grams of said carbon.

6. A filter device according to claim 2 including means for opening up said housing to permit removal of said filter materials.

7. A filter device according to claim 2 wherein said resin is a copolymeric matrix made from styrene divinylbenzene.

8. A filter device according to claim 1 wherein said resin is a copolymeric matrix made from styrene divinylbenzene.

9. A filter device according to claim 8 wherein said resin is in the form of hard spheres having a minimum sphericity of 80% and a standard screen size ranging from 20–50 wet screen mesh.

10. A filter device according to claim 8 wherein said housing is elongate with said first layer of filter material provided adjacent to said inlet.

11. A filter device according to claim 8, for domestic use wherein said housing is constructed of polyvinyl chloride pipe and a screen member is provided in said housing and over said outlet to prevent escape of carbon through said outlet.

12. A filter device according to claim 1 wherein said resin is a gel-type and can be regenerated.

13. A filter device according to claim 1 containing at least 40 grams of silicalite, at least 100 grams of resin and about 500 or more grams of said carbon.

14. A filter device according to claim 1 including means for opening up said housing to permit removal of said filter materials.

* * * * *